A. B. CAPRON.
Shuttle-Box Mechanism.
No. 197,961. Patented Dec. 11, 1877.
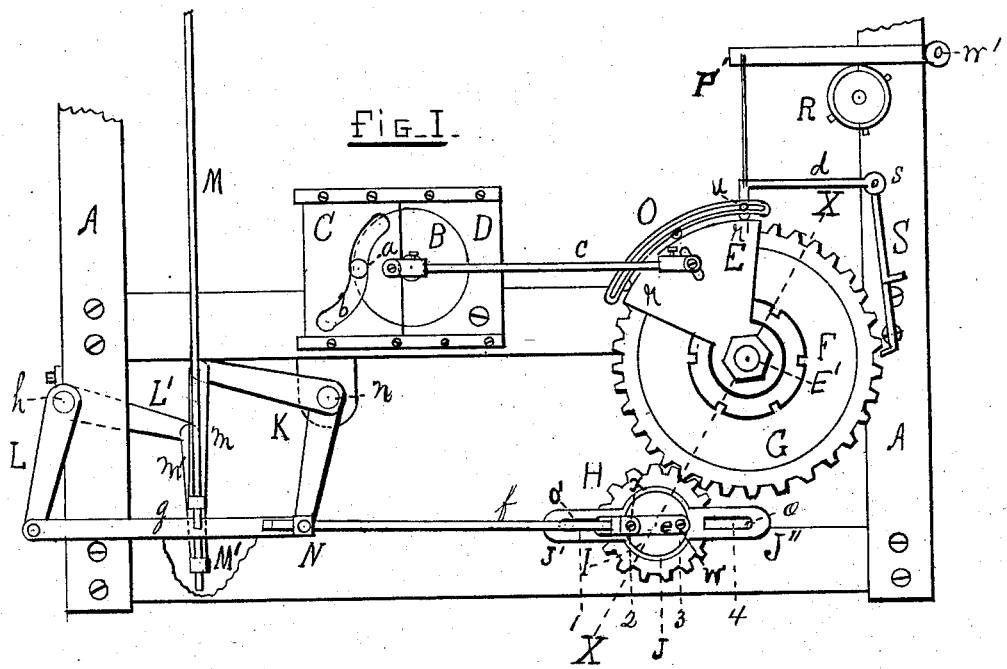
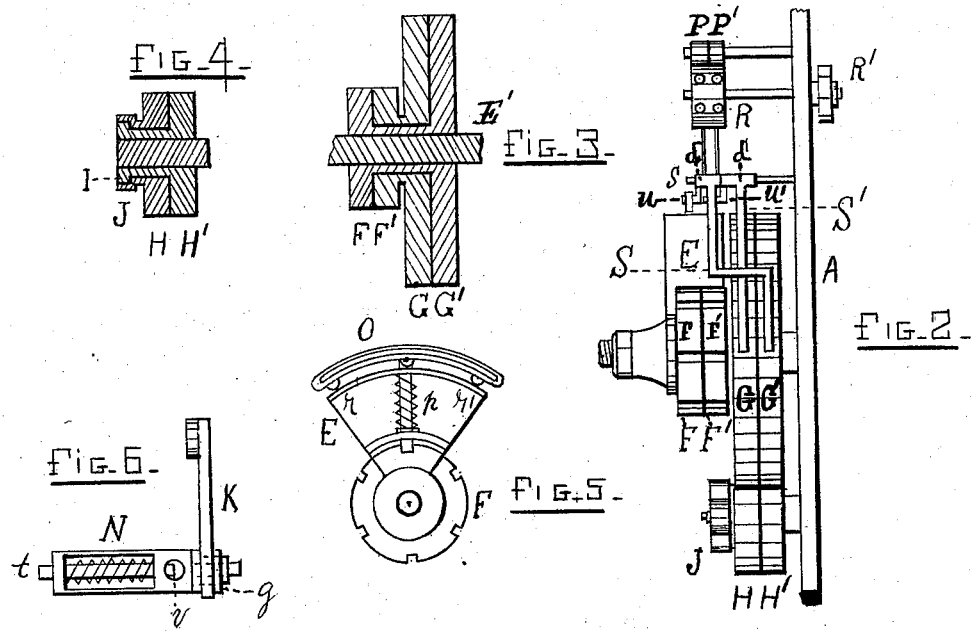
Witnesses
Inventor

UNITED STATES PATENT OFFICE.

ARIEL B. CAPRON, OF STAFFORD SPRINGS, CONNECTICUT, ASSIGNOR OF TWO-THIRDS HIS RIGHT TO JULIUS CONVERSE, OF SAME PLACE, AND LUTHER M. CAPRON, OF WORCESTER, MASSACHUSETTS.

IMPROVEMENT IN SHUTTLE-BOX MECHANISMS.

Specification forming part of Letters Patent No. 197,961, dated December 11, 1877; application filed August 2, 1875.

*To all whom it may concern:*

Be it known that I, ARIEL B. CAPRON, of Stafford Springs, in the county of Tolland and State of Connecticut, have invented certain Improvements in Looms, of which the following is a specification:

My invention relates to the construction of the mechanism for bringing any one of a series of shuttle-boxes into proper position with the race-plate of a loom, so that any desired shuttle contained in the series of boxes may be thrown through the shed.

It also relates to a device for holding the mechanism so as to maintain the boxes in any given position until further change is desired; and it still further relates to a mode of balancing the series of boxes upon the opposite sides of a loom one with the other, or either one with a weight, and interposing between the series of boxes so balanced and the operating mechanism a "tripping mechanism," so called, all of which is fully described in the following specification and the accompanying drawings, in which—

Figure 1 shows a side elevation of a device embodying my invention. Fig. 2 shows a rear elevation of the same. Figs. 3 and 4 show sectional views of a portion of the operating mechanism, taken upon a line X X in Fig. 1. Fig. 5 shows the carrier E with its face removed, and Fig. 6 represents the tripping mechanism.

The construction and operation of my shuttle mechanism are as follows:

Attached to the frame A A are the ways or gibs D, in which a sliding plate, C, is caused to move forward and backward by means of the crank-pin $a$ in the crank-plate B, which is attached to the end of the picker-shaft. The crank-pin $a$ moves in a curved slot, $b$, in the plate C, whose curvature is such that while the plate C is made to move forward and backward at each revolution of the crank-plate B the plate C experiences a period of rest during each alternate quarter-revolution of the crank-plate. The sliding plate C is connected by the rod $c$ with the carrier E, which turns upon the stud E', attached to the frame A A. The carrier E will thus possess an intermittent rotary oscillating movement, and the throw of the crank-pin $a$ should be such as to oscillate the carrier E through an arc of sixty degrees, or one-sixth of a revolution, at each movement of the sliding plate C. Within the carrier E are two pistons or plungers, $p$, one of which is shown in Fig. 5; the other, being directly behind it, is not shown. These plungers are pressed downward by spiral springs, and their lower ends fit into notches in the plate-wheels F F', which have each six equidistant notches. The oscillating movements of the carrier E are thus communicated to the plate-wheels F and F'. To the plate-wheel F is attached the gear-wheel G', and to the plate-wheel F' is attached the gear-wheel G, the wheel F and gear G' turning as one piece about the stud E', and the wheel F' and the gear G turning as one piece about the hub of F and G', as shown in Fig. 3. To the upper end of the plungers $p$ are pivoted the curved plates O, only one of which is shown, each having a slot equal to an arc of sixty degrees, or equal to the oscillation of the carrier E. Upon the under side of the curved plates O are the projections $r$ $r'$, resting upon the carrier E, and serving as fulcra. Connected with the swinging arms $d$ $d'$, loosely pivoted to the support S, are the pins $u$ $u'$, connected with the levers P P', which are raised at times by the projecting pins in the pattern-cylinder R, moved by the ratchet-wheel R', which is given an intermittent rotary motion at the proper periods of time by the moving parts of the loom.

Instead of the pattern-cylinder R a sprocket-wheel and pattern-chain may be used, or any other known and suitable device by which either one or both of the levers P P' may be raised at the desired times.

The operation of the pattern mechanism is such that the levers P P' are operated at the end of the oscillation of the carrier E, and while it is at rest. When either one of the levers P P' is raised the end of the corresponding connected curved plate O will be raised, and the plunger pivoted thereto withdrawn from the notch in the plate-wheel, and the connection thereby broken between the carrier E and one of the notched plate-wheels.

Connected with the swinging arms $d\ d'$ are the two checking-levers S and S', so arranged (see Fig. 2) that when either one of the arms $d\ d'$ is raised, the corresponding connected checking-lever will be thrown down between the teeth of the gear-wheels G G', securely holding the wheel so checked from turning; and whenever one of the plate-wheels is disconnected from the carrier by the withdrawal of the plunger, the gear-wheel attached to the plate-wheel thus disconnected will be checked; and whenever the levers P P' are allowed to fall by the pattern mechanism the spiral springs upon the plungers will force the plungers downward into notches of the plate-wheels F F', and the checking-levers connected with the arms $d\ d'$ will at the same time be raised, allowing the gear-wheels to turn with the carrier E.

It will thus be seen that the weaver, by suitably arranging the pattern mechanism, can cause either one or both of the gear-wheels G G' to oscillate with the carrier E, or to remain at rest.

Attached to the loom-frame, and driven by the gear-wheels G G', are the pinions H H', which are one-third the size of the gear-wheels G G', so that when the gear-wheels are oscillated through one-sixth of a revolution at each throw of the carrier E the pinions will move through one-half of a revolution. The pinion H' turns upon a stud attached to the loom-frame, and to its hub is attached the crank-plate I, as shown in sectional view in Fig. 4.

To the pinion H is attached the shell or sleeve J, both turning as one piece upon the hub of the pinion H', as shown in Fig. 4. The sleeve surrounds the crank-plate I, and is provided with two arms, J' and J'', having slots O O'.

Two arms are necessary, in order to balance the sleeve J, and also in order to allow the opposite halves of the pinion H to be brought into operation with the gear-wheel G when the same may have become worn by use.

To the crank-plate I is attached the link $e$, one end of which turns loosely upon the crank-pin W, and the other is supported by and slides in the slot O'.

At a point, X, in the link $e$, at a distance from the pin W equal to the throw of the crank-pin W, is pivoted the rod $f$, the opposite end of which passes through the hole V in the tripping mechanism N, Fig. 6. The pin $t$ has a beveled end, fitting a correspondingly-shaped incision in the rod $f$, and is pressed against the same by a spiral spring.

The tripping mechanism is attached to the bell-crank lever K, and also to the link $g$, connecting the lever L. The bell-crank lever K turns upon a stud, $n$, and to the horizontal arm is hung the shuttle-box rod M by means of the link $m$.

The lever L is attached to a shaft, $h$, which passes to the opposite side of the loom, and has on its opposite end an arm, L', upon which the shuttle-box rod M' is hung by means of the link $m'$.

It will readily be seen that whenever the bell-crank lever K is made to carry the shuttle-box rod M upward, the shuttle-box rod M' will have a downward movement of equal extent, and vice versa. The weight of the two series of boxes is thus made to balance each other at the point N, where I interpose the tripping mechanism between the boxes and the operating-rod $f$.

The tripping mechanism was usually applied directly to the shuttle-box rods, and the spiral or other spring used to operate the pin $t$ or other similar device was obliged to support the entire series of boxes, and a separate tripping mechanism was required for each shuttle-box rod, and the failure of these to operate, owing to the strain upon them, has always been a source of great annoyance.

By the above-described method the tripping mechanism has only to overcome the friction of the series of shuttle-boxes, and a very light spring can be used, so that in case the movements of the shuttle-boxes are obstructed in any manner the rod $f$ will readily free itself from the pin $t$, and thus prevent any breakage of the mechanism.

The several boxes in the series are brought into line with the race-plate as follows: In Fig. 1 the link $e$ and pivot $x$ stand in the proper position to hold the box next the lower one, in line with the race-plate upon the nearest side of the loom, and the box next the upper one in the same position on the opposite side of the loom. If the crank-plate I be revolved one-half a revolution it will throw the link $e$ forward, bringing the pivot $x$ in position marked 1 in Fig. 1, and raise the nearest series of boxes the space of one box, and the opposite series will be carried downward the same distance. If the crank-plate I and sleeve J be both revolved one-half a revolution, it will bring the pivot $x$ in the position marked 4, and bring the upper box of the nearest series and the lower box of the opposite series in line with the race-plate. If the crank-plate alone be now revolved one-half a revolution, the pivot $x$ will be brought into the position marked 3, and the nearer series of boxes will be raised the space of one box, and the opposite series carried downward to the same extent. Thus any one of a series of four shuttle-boxes can be brought into line with the race-plate of the loom at the will of the operator at any oscillation of the carrier by so arranging the pattern mechanism as to maintain or break the connection between the carrier E and the notched plate-wheels F F'.

In the device above described the two series of boxes move in unison, or one series moves upward while the other moves downward. In case it is desired to cause the two series to move independently, it is necessary to use two operating mechanisms, one for each series of boxes. The above-described mechanism is sufficient to operate a series of either two, three, or four boxes; and in case a greater number are used, the number of the oscillating gear-wheels G G' and their connected mechanisms must be increased. In case only one series of boxes are used, a weight may be attached to the lever on the opposite side of the loom, in order to balance the series used.

I do not claim as my invention the above-described mode of balancing the series of boxes each with the other, or either one with a weight, or any other mode of balancing the same, as that has frequently been done; but my invention relates to the arrangement of a tripping mechanism with reference to the operating mechanism and the balanced shuttle-boxes, so as to relieve the tripping mechanism of too great strain.

What I claim as my invention, and desire to secure by Letters Patent, is—

1. The combination, with the carrier E and plungers $p$, operated by pattern mechanism, plate-wheels F F', and oscillating gear-wheels G G', of a sliding plate, C, all constructed and operating as described, and for the purposes set forth.

2. The combination, with the oscillating gear-wheels G G', swinging arms $d$ $d'$, and checks S S', of a suitable pattern mechanism, as described, and for the purposes set forth.

3. The combination, with the oscillating gear-wheels G G' and pinions H H', of a sleeve, J, and crank-plate I, with link $e$, as described, and for the purposes set forth, all connected with a series of shuttle-boxes, substantially as described.

4. The combination, with the oscillating gear-wheels G G', pinions H H', sleeve J, crank-plate I, and link $e$, of a pattern mechanism, as described, and for the purposes set forth.

5. The combination, with a bell-crank lever, K, arms L and L', and shaft $h$, all arranged and connected with two series of shuttle-boxes, as described, of a tripping mechanism, N, and driving-rod $f$, connected with any suitable operating mechanism, in the manner described, and for the purposes set forth.

6. The combination, with one or more series of shuttle-boxes, of a tripping mechanism, N, driving-rod $f$, oscillating sleeve J, crank-plate I, with link $e$, pinions H H' gear-wheels G G', carrier E, plungers $p$, operated by a pattern mechanism, sliding plate C, swinging arms $d$ $d'$, and checking-levers S S', substantially as described, and for the purpose set forth.

ARIEL B. CAPRON.

Witnesses:
   J. V. SQUIER,
   JULIUS CONVERSE.